June 23, 1925.  1,543,189
S. W. RAWLS
SCREEN FOR WINDSHIELDS
Filed Aug. 29, 1924
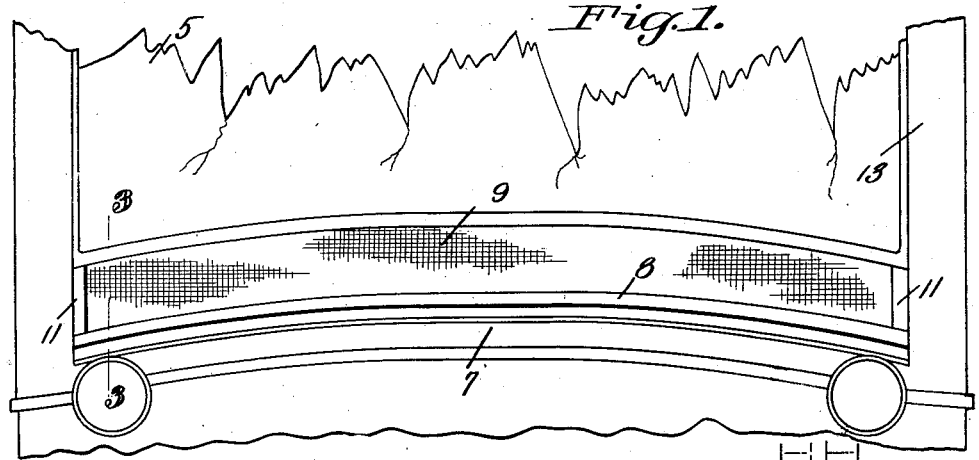
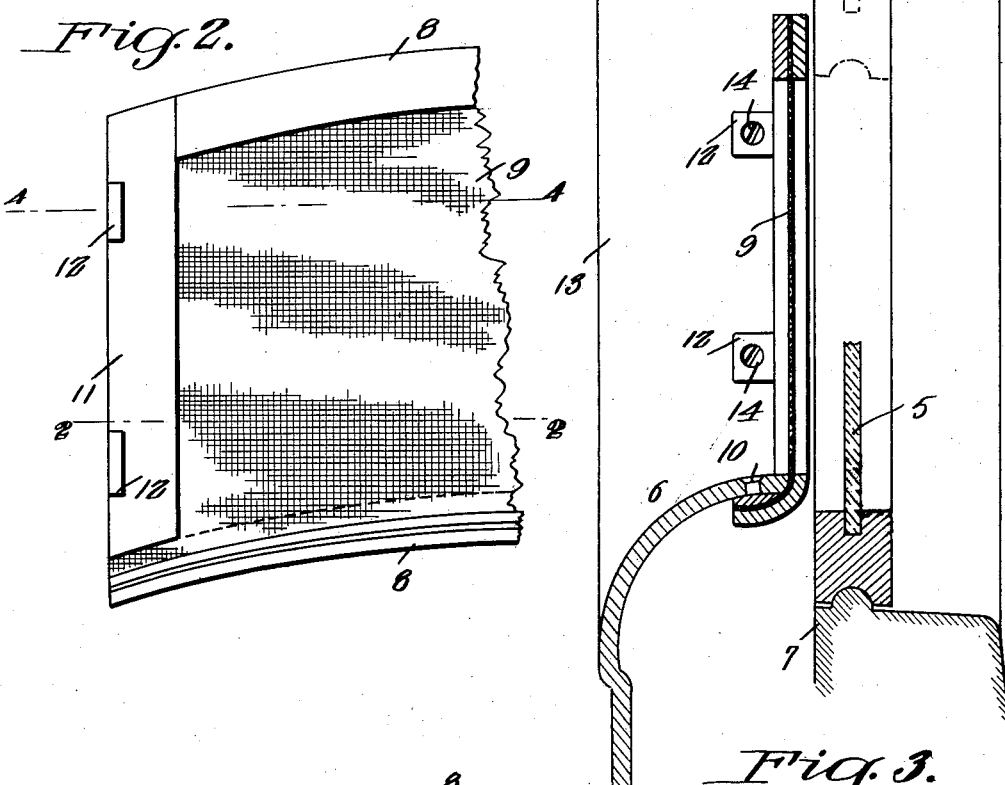
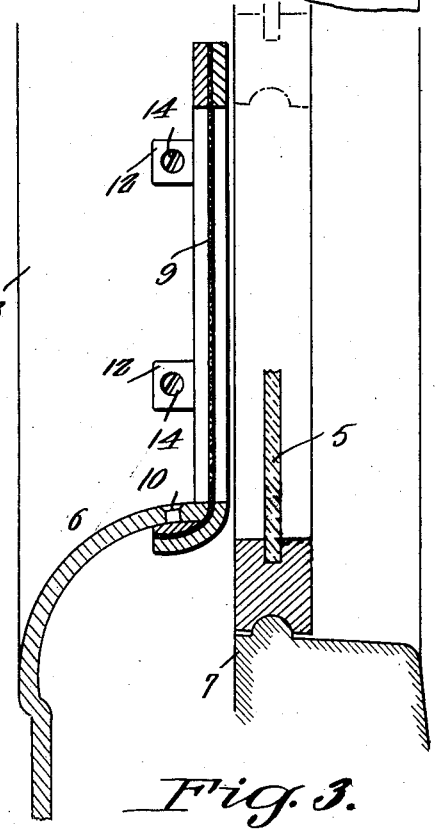
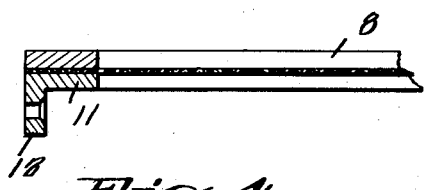
S. W. Rawls, Inventor
By C. A. Snow & Co
Attorneys Patented June 23, 1925.

1,543,189

UNITED STATES PATENT OFFICE.

SOL WAITE RAWLS, OF FRANKLIN, VIRGINIA.

SCREEN FOR WINDSHIELDS.

Application filed August 29, 1924. Serial No. 734,989.

*To all whom it may concern:*

Be it known that I, SOL W. RAWLS, a citizen of the United States, residing at Franklin, in the county of Southampton and State of Virginia, have invented a new and useful Screen for Windshields, of which the following is a specification.

This invention relates to a novel form of screen especially designed for use in connection with motor vehicle wind shields, the primary object of the invention being to provide means for guarding the space between the lower edge of the wind shield and the cowl or frame against which the wind shield moves, when the wind shield is moved to its open position.

A further important object of the invention is to provide a device of this character which may be readily and easily positioned and secured in place, eliminating the necessity of making alterations in the wind shield or wind shield frame construction to apply the screen.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view disclosing a screening device constructed in accordance with the invention and positioned under a wind shield.

Figure 2 is an enlarged fragmental elevational view disclosing one end of a wind shield screen.

Figure 3 is a sectional view taken on line 3—3 of Figure 1.

Figure 4 is a sectional view taken on line 4—4 of Figure 2.

Referring to the drawing in detail, a vertically movable wind shield is indicated at 5, the lower edge of which is curved to fit the usual curved cowl construction, of a motor vehicle.

The reference character 6 indicates the lower section of the cowl ventilator and as shown, this section 6 curves forwardly where it is spaced from the lower section 7 of the wind shield frame so that air may pass between the members 6 and 7 and be directed downwardly within the body of the vehicle.

The screen forming the essence of the invention is relatively long and extends the entire width of the wind shield as clearly shown by Figure 1 of the drawing, the upper and lower sections of the frame indicated at 8 being curved to conform to the curvatures of the members 6 and lower edge of the wind shield.

The members 8 embody opposed sections between which the screening material 9 is held, suitable means being provided for securing the sections of the members 8 together to hold the screening material against movement with respect to its frame.

As shown, the lower member 8 is curved inwardly to closely fit under the member 6 where it is secured by means of the rivets 10. Extending inwardly from the end sections 11 of the screen frame are apertured ears 12 that fit against the inner surfaces of the side members 13 of the wind shield frame where they may be supplied with suitable securing screws 14 for securing the screen against movement.

From the foregoing it will be obvious that due to the construction, a screening member may be readily secured in position adjacent to a wind shield to the end that when the wind shield is raised to ventilate the vehicle, the space between the lower edge of the wind shield and vehicle cowl will be guarded to prevent insects or other foreign matter from entering the vehicle.

I claim:—

In combination with a curved section of a cowl ventilator of a motor vehicle, a screening device including a frame having a lower curved section adapted to be fitted under the curved section of the cowl ventilator, ears formed at the ends of the frame and adapted to engage the side members of a windshield frame, and a screening member supported within the frame.

In testimony that I claim the foregoing as my own, I have hereto affixed my signature in the presence of two witnesses.

SOL WAITE RAWLS.

Witnesses:
J. E. BRYANT,
GEORGIE EDWARDS.